United States Patent
Ikeda et al.

(10) Patent No.: US 12,371,615 B2
(45) Date of Patent: Jul. 29, 2025

(54) METHOD OF TREATING QUANTUM DOT-CONTAINING AQUEOUS SOLUTION

(71) Applicant: SHARP KABUSHIKI KAISHA, Sakai (JP)

(72) Inventors: Yusuke Ikeda, Sakai (JP); Masakazu Kamura, Sakai (JP); Yuka Utsumi, Sakai (JP); Yasushi Asaoka, Sakai (JP); Takahiro Adachi, Sakai (JP)

(73) Assignee: SHARP KABUSHIKI KAISHA, Osaka (JP)

( * ) Notice: Subject to any disclaimer, the term of this patent is extended or adjusted under 35 U.S.C. 154(b) by 441 days.

(21) Appl. No.: 17/921,968

(22) PCT Filed: Mar. 22, 2021

(86) PCT No.: PCT/JP2021/011590
§ 371 (c)(1),
(2) Date: Oct. 27, 2022

(87) PCT Pub. No.: WO2021/225039
PCT Pub. Date: Nov. 11, 2021

(65) Prior Publication Data
US 2023/0174860 A1 Jun. 8, 2023

(30) Foreign Application Priority Data

May 8, 2020 (JP) ................................. 2020-082554

(51) Int. Cl.
*C09K 11/88* (2006.01)
*B82Y 20/00* (2011.01)
*C09K 11/08* (2006.01)

(52) U.S. Cl.
CPC ........ *C09K 11/883* (2013.01); *C09K 11/0883* (2013.01); *B82Y 20/00* (2013.01)

(58) Field of Classification Search
CPC .......................... C09K 11/0883; C09K 11/883
See application file for complete search history.

(56) References Cited

U.S. PATENT DOCUMENTS

2018/0142149 A1 5/2018 Youn et al.
2021/0095200 A1 4/2021 Youn et al.

FOREIGN PATENT DOCUMENTS

JP 2018084823 A 5/2018
WO WO 2006/054402 * 5/2006

\* cited by examiner

*Primary Examiner* — C Melissa Koslow
(74) *Attorney, Agent, or Firm* — ScienBiziP, P.C.

(57) ABSTRACT

A method of treating an aqueous solution containing quantum dots, the method includes: a dissolution liquid preparation step of dissolving a quaternary ammonium salt and a potassium salt in an aqueous solution containing quantum dots to prepare a dissolution liquid; a phase separation step of heating the dissolution liquid to separate the dissolution liquid into two phases, which are a quaternary ammonium salt phase containing a large amount of the quaternary ammonium salt and a potassium salt phase containing a large amount of the potassium salt, and also to cause the quantum dots to be included in either one of the quaternary ammonium salt phase and the potassium salt phase; and a fractionation step of separating the quaternary ammonium salt phase and the potassium salt phase by fractionation.

11 Claims, No Drawings

METHOD OF TREATING QUANTUM DOT-CONTAINING AQUEOUS SOLUTION

TECHNICAL FIELD

The disclosure relates to a method of treating a quantum dot-containing aqueous solution. The present disclosure claims the benefit of priority to Japanese Patent Application, Tokugan, No. 2020-082554 filed on May 8, 2020, the entire contents of which are incorporated herein by reference.

BACKGROUND ART

Quantum dots (QD's) are nano-sized semiconductor fine particles (semiconductor nanocrystals) and exhibit distinct optical and electrical properties owing to the quantum confinement effect by which electrons and excitons are confined inside nanocrystals. Owing to these properties, quantum dots are expected to be utilized in a wide range of fields from the device field (optical elements and electric elements) to the medical field (fluorescent materials for biomarkers). In particular, quantum dots are expected to be applied to display devices with excellent color purity because quantum dots discharge light of wavelengths that are controllable through the particle diameter so as to have a very narrow spectrum width.

For instance, Patent Literature 1 describes an example of application to the display device, disclosing technology of forming a light-emitting layer patterned using a photosensitive resin composition containing quantum dots (optical conversion substance).

Such patterning using a photosensitive resin composition produces a large amount of effluent containing quantum dots in, for example, a development step. Some quantum dots contain elements that are toxic to the human body and environment such as cadmium and selenium, and some quantum dots contain heavy metals such as indium. Accordingly, the disposal of quantum dot-containing effluent will require a special treatment and hence extra cost over the disposal of a non-quantum-dot-containing aqueous solution. In addition, since the disposal of effluent typically does not depends on the amount of toxic substances contained, but is dictated by the volume or weight of the effluent to be treated. Therefore, there is a demand for technology to concentrate quantum dots in, and reduce the volume of, the quantum dot-containing effluent.

CITATION LIST

Patent Literature

Patent Literature 1: Japanese Unexamined Patent Application Publication, Tokukai, No. 2018-84823

SUMMARY

Technical Problem

To concentrate quantum dots in a quantum dot-containing effluent, particularly in a quantum dot-containing aqueous solution, the effluent or aqueous solution may be simply heated and/or depressurized to evaporate water. However, such heating and/or depressurizing the aqueous solution to evaporate water therein will require a large-scale facility and a huge amount of energy until the quantum dots are concentrated.

Accordingly, the disclosure, in an aspect thereof, has an object to provide, for example, a method of treating a quantum dot-containing aqueous solution by which quantum dots can be concentrated in a more simple and convenient manner.

Solution to Problem

The disclosure, in an aspect thereof, is directed to a method of treating an aqueous solution containing quantum dots, the method including: a dissolution liquid preparation step of dissolving a quaternary ammonium salt and a potassium salt in an aqueous solution containing quantum dots to prepare a dissolution liquid; a phase separation step of heating the dissolution liquid to separate the dissolution liquid into two phases, which are a quaternary ammonium salt phase containing a large amount of the quaternary ammonium salt and a potassium salt phase containing a large amount of the potassium salt, and also to cause the quantum dots to be included in either one of the quaternary ammonium salt phase and the potassium salt phase; and a fractionation step of separating the quaternary ammonium salt phase and the potassium salt phase by fractionation.

Advantageous Effects of Disclosure

The present disclosure enables concentrating quantum dots in, and reducing the volume of, a quantum dot-containing aqueous solution such as effluent in a simple and convenient manner.

DESCRIPTION OF EMBODIMENTS

The following will describe a preferred example of carrying out the disclosure. The following embodiment is however merely illustrative and does not at all limit the scope of the disclosure.

A method of treating a quantum dot-containing aqueous solution (effluent) in accordance with the present embodiment includes, for example, (1) a dissolution liquid preparation step, (2) a phase separation step, and (3) a fractionation step.

(1) Dissolution Liquid Preparation Step

The dissolution liquid preparation step dissolves a quaternary ammonium salt and a potassium salt in a quantum dot-containing aqueous solution to prepare a dissolution liquid. The prepared dissolution liquid dissolves the quaternary ammonium salt and the potassium salt at such a concentration as to have a minimum critical solution temperature.

(2) Phase Separation Step

The phase separation step heats the dissolution liquid prepared in the dissolution liquid preparation step to separate the dissolution liquid into two phases, which are a quaternary ammonium salt phase containing a large amount of the quaternary ammonium salt and a potassium salt phase containing a large amount of the potassium salt, and also to cause the quantum dots to be included in either the quaternary ammonium salt phase or the potassium salt phase. This heating enables readily separating the prepared dissolution liquid into two phases (a quaternary ammonium salt phase and a potassium salt phase) by heating the dissolution liquid to or above the minimum critical solution temperature. Note that the quaternary ammonium salt phase contains the quaternary ammonium salt in a larger amount than does the potassium salt phase that is one of the two phases into which the dissolution liquid has been separated. The potassium salt phase contains the potassium salt in a larger amount than does the quaternary ammonium salt phase that is one of the two phases into which the dissolution liquid has been separated. In addition, the minimum critical solution temperature is, for example, below 100° C., which allows a relatively small amount of energy to perform the heating.

(3) Fractionation Step

The fractionation step separates, by fractionation, the quaternary ammonium salt phase and the potassium salt phase into which the dissolution liquid has been separated in the phase separation step. The fractionation step enables concentrating quantum dots. Note that which one of the phases contains quantum dots can be verified by, for example, shining light of a wavelength under which the quantum dots can emit light, to let one of the phases to emit light.

The quantum dots are not limited in any particular manner. Examples include those with either a CdS or CdTe core structure or a CdSe/ZnS, InP/ZnSe, InP/ZnS, or InP/ZnSe/ZnS core/shell structure with a particle diameter of 2 to 10 nm. These quantum dots may have, adsorbed to the surface thereof as ligands, a carboxylic acid, a sulfonic acid, a long-chain alkane with an ionic species such as a quaternary amine, or an ionic polymer. These quantum dots can preferably disperse in an aqueous solution and, in the present embodiment, have a concentration of, for example, 10 ppb or higher in an aqueous solution. In other words, the quantum dots preferably have a concentration of 10 ppb or higher in an aqueous solution used in the present embodiment.

The quaternary ammonium salt is represented by, for example, a chemical formula: $NR_4^+X^-$, where each R is independently a $C_1$-$C_{20}$ alkyl group. In particular, the alkyl group is preferably a methyl group, an ethyl group, a propyl group, a butyl group, or a pentyl group in view of solubility in water. Meanwhile, as the chain length of the alkyl group grows, hydrophobicity increases, and hence the dissolution liquid becomes more likely to undergo a phase separation. $X^-$ is a counter anion. $X^-$ is preferably a bromide ion, an iodide ion, or a nitrate ion in view of the Hofmeister series, which is one of indices of ease in salting-out. In particular, the quaternary ammonium salt is preferably tetrabutylammonium bromide in view of solubility in water, the cost of raw materials, and the reproducibility of phase separation.

A potassium salt facilitates the salting-out of the quaternary ammonium salt in an aqueous solution. By heating an aqueous solution containing quantum dots, a quaternary ammonium salt, and a potassium salt, the aqueous solution can be separated into two phases: a quaternary ammonium salt phase and a potassium salt phase. This two-phase separation is presumably due to the alkyl chains of the quaternary ammonium salt being folded up, thereby prohibiting the quaternary ammonium salt from being dissolved in water, when the aqueous solution is heated.

The anionic species (counter anions) in the potassium salt is preferably nitrate ions, bromide ions, or iodide ions, which have a relatively high salt solubility. This configuration causes the potassium salt to be miscible in water, thereby producing a uniform liquid (aqueous solution), at room temperature and still allows the dissolution liquid to readily separate into the quaternary ammonium salt phase and the potassium salt phase when heated. Since the quantum dots can be included in either the quaternary ammonium salt phase or the potassium salt phase, it is possible to extract the quantum dots. Additionally, the potassium salt preferably has a high solubility in water also for the salting-out of the quaternary ammonium salt dissolved in water and has a solubility of preferably at least 1 gram per 100 grams of water and more preferably at least 10 grams per 100 grams of water, both at 20° C. In addition, by the potassium salt and the quaternary ammonium salt containing the same anionic species, no ion exchange occurs, which enables stable phase separation.

In view of the foregoing discussion, the quaternary ammonium salt is preferably tetrabutylammonium bromide (TBAB), and the potassium salt is preferably potassium bromide.

In addition, in the dissolution liquid preparation step (1), the total mass of the quaternary ammonium salt and the potassium salt in the dissolution liquid is preferably from 20 mass % to 70 mass %, both inclusive, and more preferably from 30 mass % to 60 mass %, both inclusive, of the mass of the dissolution liquid. This configuration facilitates adjustment to such a concentration that the dissolution liquid have a minimum critical solution temperature. Additionally, the adjustment to the concentration enables the separation into the two phases (quaternary ammonium salt phase and potassium salt phase) in a satisfactory manner.

Note that in the dissolution liquid, the minimum critical solution temperature tends to rise, for example, when the total concentration of the quaternary ammonium salt and the potassium salt decreases in the dissolution liquid. Therefore, the higher the total concentration of the quaternary ammonium salt and the potassium salt, the better, because the smaller the energy for the heating for the separation into the two phases. On the other hand, the lower the total concentration of the quaternary ammonium salt and the potassium salt, the lower the cost of materials.

Additionally, in the dissolution liquid in the dissolution liquid preparation step (1), the mass ratio of the potassium salt to the quaternary ammonium salt is preferably from 0.1 to 3.5, both inclusive, and more preferably from 0.2 to 3.0, both inclusive. This configuration enables easier separation of the dissolution liquid into the two phases (quaternary ammonium salt phase and potassium salt phase) particularly when the dissolution liquid is heated to or above the minimum critical solution temperature.

Additionally, the method of treating a quantum dot-containing aqueous solution (effluent) in accordance with the present embodiment may include, after the fractionation step (3), (4) a second dissolution liquid preparation step, (5) a second phase separation step, and (6) a second fractionation step.

(4) Second Dissolution Liquid Preparation Step

The second dissolution liquid preparation step, for example, adds a quantum dot-containing aqueous solution to a quantum dot-containing one of the upper and lower phases into which the dissolution liquid was fractionated in the fractionation step, to prepare a dissolution liquid again. Furthermore, for example, either one of the quaternary ammonium salt and the potassium salt or both may be further added to adjust the minimum critical solution temperature of the dissolution liquid.

(5) Second Phase Separation Step

The second phase separation step heats the dissolution liquid prepared in the second dissolution liquid preparation step to separate the dissolution liquid into two phases, which are a quaternary ammonium salt phase containing a large amount of the quaternary ammonium salt and a potassium salt phase containing a large amount of the potassium salt, and also to cause the quantum dots to be included in either the quaternary ammonium salt phase or the potassium salt phase. Note that this second phase separation step is the same as the aforementioned phase separation step (2).

(6) Second Fractionation Step

The second fractionation step separates the quaternary ammonium salt phase and the potassium salt phase by fractionation. Note that the second fractionation step is the same as the fractionation step (3).

Furthermore, the quantum dots can be further concentrated by, subsequently to the second fractionation step, repeatedly subjecting the upper or lower phase obtained by fractionation in the second fractionation step to the second dissolution liquid preparation step (4), the second phase separation step (5), and the second fractionation step (6).

The method of treating a quantum dot-containing aqueous solution in accordance with the present embodiment is a simple and convenient process in which a quaternary ammonium salt and a potassium salt are added, the mixture is heated for a two-phase separation, and a quantum dot-containing phase is obtained by fractionation. This configuration produces a quantum dot-containing phase containing less water, and hence having a smaller overall volume, than the initial quantum dot-containing aqueous solution. Therefore, it is possible to reduce the volume of the quantum dot-containing aqueous solution to be disposed of, and hence to restrain treatment cost, when compared with the initial quantum dot-containing aqueous solution being treated for disposal as is.

Example 1

Quantum dots were used that emitted red or green light under light of a wavelength of 365 nm, that had an InP/ZnSe/ZnS core/shell structure, and that had ligands. In each example, aqueous solution A containing the aforementioned green quantum dots dispersed at 40 ppm in a 5 mmol/L potassium hydroxide aqueous solution and aqueous solution B containing the aforementioned red quantum dots dispersed at 40 ppm in a 5 mmol/L potassium hydroxide aqueous solution were used as quantum dot-containing aqueous solutions. Note that aqueous solution A was used in Example 1-1, and aqueous solution B was used in Examples 1-2 to 1-5.

Next, tetrabutylammonium bromide (TBAB) as a quaternary ammonium salt and either potassium bromide (KBr) or potassium nitrate ($KNO_3$) as a potassium salt were added to the quantum dot-containing aqueous solution of each of the aforementioned examples to a weight ratio shown in Table 1, to prepare a dissolution liquid.

After the addition, the mixture was well stirred at room temperature at approximately 400 rpm in a mechanical stirrer to dissolve the mixture and to obtain a uniform solution.

Next, the dissolution liquid was heated for approximately 30 minutes to 40° C. to 60° C. shown in Table 1 by using a heater. As a result, a phase separation into an upper phase and a lower phase was observed.

Under 365-nm light, only either one of the upper and lower phases of this phase-separated dissolution liquid emitted red or green light as shown in Table 1, which verifies that the quantum dots are existent in either one of the upper and lower phases.

The mass ratios of the potassium salt to the quaternary ammonium salt in Table 1 also show that the quantum dots can be unevenly distributed into either one of the phases in a satisfactory manner when the mass ratio is from 0.1 to 3.5, both inclusive.

Furthermore, in Example 1-1, the two phases (upper and lower phases) were separated by fractionation using a separation funnel. By using an evaporator, water was evaporated from each of the upper and lower phases obtained by fractionation. Next, the solid obtained from each of the upper and lower phases was dissolved in ultrapure water to 1 wt %, and the pH and the approximate concentrations of quaternary ammonium ions and potassium ions were measured. Results are shown in Table 2.

TABLE 2

| Component | Upper Phase | Lower Phase |
| --- | --- | --- |
| Hydrogen Ion | pH 7 | pH 9 |
| Quaternary Ammonium Ion | 500 mg/L | 250 mg/L |
| Potassium Ion | 450 mg/L | 1,500 mg/L |

Table 2 shows that the upper phase is a quaternary ammonium salt phase containing a large amount of quaternary ammonium ions and that the lower phase is a potassium salt phase containing a large amount of potassium ions. Table 2 also shows that the lower phase contains a large amount hydroxide ions. These observations indicate that the upper phase is an oleophilic phase and that the lower phase is a hydrophilic phase. That in turn indicates that the quantum dots can be unevenly distributed into the upper phase if the quantum dots have an oleophilic outermost layer and into the lower phase if the quantum dots have a hydrophilic outermost layer. That the quantum dots can be unevenly distributed into either one of the upper and lower phases is evident also from the fact that only either one of the upper and lower phases emits light as shown in Table 1.

TABLE 1

| | | | Mass Ratio | | | | |
| | Color of Light Emitted by | QD-containing Aqueous | Quaternary Ammonium Salt | Potassium Salt | | Mass Ratio of Potassium Salt to Quaternary | results | |
| Example | QD's | Solution | TBAB | KBr | $KNO_3$ | Ammonium Salt | Heating Temperature | Phase Where Light-emission was Observed |
| --- | --- | --- | --- | --- | --- | --- | --- | --- |
| 1-1 | Green | 5 | 3 | 2 | — | 0.6 | 60° C. | Lower Phase |
| 1-2 | Red | 5 | 3 | 2 | — | 0.6 | 60° C. | Upper Phase |
| 1-3 | Red | 6 | 1 | 3 | — | 3.0 | 50° C. | Upper Phase |
| 1-4 | Red | 4 | 5 | 1 | — | 0.2 | 40° C. | Upper Phase |
| 1-5 | Red | 7 | 1 | — | 2 | 2.0 | 40° C. | Upper Phase |

Example 2

Red light-emitting, quantum dot-containing aqueous solution B was used as in Example 1. A dissolution liquid in which a treatment agent had been added to aqueous solution B was prepared in Examples 2-1 to 2-4 as shown in Table 3.

TABLE 3

| | Aqueous | Treatment Agent | | | | Two-phase | Results Minimum Critical Solution |
|---|---|---|---|---|---|---|---|
| Example | Solution B | TBAB | KBr | Total | TBAB:KBr | Separation | Temperature |
| 2-1 | 100-Total | 38.5 | 16.5 | 55.0 | 7:3 | Observed | 37° C. |
| 2-2 | 100-Total | 36.4 | 15.5 | 52.0 | 7:3 | Observed | 50° C. |
| 2-3 | 100-Total | 35.0 | 15.0 | 50.0 | 7:3 | Observed | 55° C. |
| 2-4 | 100-Total | 31.5 | 13.5 | 45.0 | 7:3 | Observed | 60° C. |

*Values in the table are mass ratios where the sum of the aqueous solution and the treatment agent is equal to 100.

The prepared dissolution liquid was heated from room temperature, and the temperature at which the dissolution liquid separated into two phases, that is, the minimum critical solution temperature, was measured. Results are shown in Table 3. The results demonstrate that the minimum critical solution temperature decreases with an increasing total concentration of the quaternary ammonium salt and the potassium salt in the dissolution liquid.

Note that when the liquid separated into two phases was placed under 365-nm light, only the lower phase emitted red light, which verifies that the quantum dots are existent in the lower phase.

Example 3

After the dissolution liquid was separated into two phases in Example 2-1, the quantum dot-containing, lower phase was collected by fractionation.

Next, the same volume of aqueous solution B used in Example 1 as the volume of this lower phase was added to the lower phase. A uniform dissolution liquid was obtained when the lower phase and aqueous solution B were mixed.

When the obtained dissolution liquid was heated to 40° C., the dissolution liquid separated into an upper and a lower phase. It was observed that the lower phase obtained by separation emitted red light under 365-nm light. Further observations of the light emission intensity of the red light emission showed that the light emission intensity was higher than the light emission intensity of the lower phase obtained by separation in Example 2-1. These results demonstrate that the quantum dots can be concentrated without having to add a treatment agent every time and also that the usage of the treatment agent, hence the treatment cost, can be reduced.

The disclosure is not limited to the description of the embodiments above. Any structure detailed in the embodiments may be replaced by a practically identical structure, a structure that achieves the same effect and function, or a structure that achieves the same purpose.

The invention claimed is:

1. A method of treating an aqueous solution including quantum dots, the method comprising:
   dissolving a quaternary ammonium salt and a potassium salt in the aqueous solution including the quantum dots to prepare a dissolution liquid;
   heating the dissolution liquid to separate the dissolution liquid into two phases, which are a quaternary ammonium salt phase including a large amount of the quaternary ammonium salt and a potassium salt phase including a large amount of the potassium salt, and also to cause the quantum dots to be included in either one of the quaternary ammonium salt phase and the potassium salt phase; and
   separating the quaternary ammonium salt phase and the potassium salt phase by fractionation.

2. The method according to claim 1, wherein the quaternary ammonium salt and the potassium salt are dissolved to a concentration at which the dissolution liquid has a minimum critical solution temperature.

3. The method according to claim 2, wherein the dissolution liquid is heated to or above the minimum critical solution temperature.

4. The method according to claim 1, wherein the quaternary ammonium salt and the potassium salt are dissolved to account, in total, for 20 mass % to 70 mass %, both inclusive, of the dissolution liquid.

5. The method according to claim 1, wherein the potassium salt has a mass ratio of 0.1 to 3.5, both inclusive, to the quaternary ammonium salt.

6. The method according to claim 1, wherein the quaternary ammonium salt is $NR_4^+X^-$ where R is an identical or different $C_1$-$C_{20}$ alkyl group and $X^-$ is a counter anion.

7. The method according to claim 6, wherein $X^-$ is at least one species selected from a bromide ion, an iodide ion, and a nitrate ion.

8. The method according to claim 6, wherein the quaternary ammonium salt is tetrabutylammonium bromide.

9. The method according to claim 6, wherein $X^-$ is identical to a counter anion in the potassium salt.

10. The method according to claim 1, wherein the potassium salt is at least one species selected from potassium bromide and potassium nitrate.

11. The method according to claim 1, further comprising:
   adding another aqueous solution including quantum dots to a solution in a quantum dot-containing phase obtained by the fractionation to prepare another dissolution liquid;
   heating the other dissolution liquid to separate the other dissolution liquid into two phases, which are another quaternary ammonium salt phase including another large amount of the quaternary ammonium salt and another potassium salt phase including another large amount of the potassium salt, and also to cause the quantum dots to be included in either one of the other quaternary ammonium salt phase and the other potassium salt phase; and
   separating the other quaternary ammonium salt phase and the other potassium salt phase by fractionation.

* * * * *